United States Patent [19]

Klupfel et al.

[11] 3,882,168

[45] May 6, 1975

[54] PHOTOPOLYMERIZABLE COMPOUNDS

[75] Inventors: Kurt-Walter Klüpfel, Wiesbaden-Sonnenberg; Hartmut Steppan, Wiesbaden-Dotzheim; Manfred Hasenjäger, Hochheim, all of Germany

[73] Assignee: Hoechst Aktiengesellschaft

[22] Filed: Sept. 3, 1971

[21] Appl. No.: 177,847

[30] Foreign Application Priority Data

Sept. 7, 1970 Germany ........................ 2044233

[52] U.S. Cl. ............... 260/486 R; 96/86 R; 117/72; 117/75; 204/159.22; 260/345.8

[51] Int. Cl. .............................................. C07c 69/54

[58] Field of Search ..................... 260/486 R, 345.8

[56] References Cited

UNITED STATES PATENTS

| | | | |
|---|---|---|---|
| 2,626,926 | 1/1957 | DeGroote | 260/486 R |
| 3,558,535 | 1/1971 | Rushton et al. | 260/345.8 |
| 3,681,244 | 8/1972 | Obelz et al. | 260/345.8 |

*Primary Examiner*—Lorraine A. Weinberger
*Assistant Examiner*—Paul J. Killos
*Attorney, Agent, or Firm*—James E. Bryan

[57] ABSTRACT

This invention relates to novel photopolymerizable compounds, to a method of preparing the novel compounds, and to photopolymerizable copying compositions including the new compounds. The novel photopolymerizable compounds have the formula

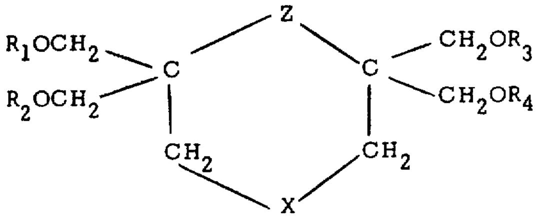

in which X is selected from the group consisting of a single bond, an oxygen atom and a $—CH_2—$ group, Z is selected from the group consisting of —CO— and —CHOH— groups, and $R_1$, $R_2$, $R_3$, and $R_4$ are selected from the group consisting of hydrogen and acryloyl or methacryloyl groups, Z is a carbonyl group if X is a single bond and, on an average, at least one of the groups $R_1$, $R_2$, $R_3$, and $R_4$ is an acryloyl group.

5 Claims, No Drawings

PHOTOPOLYMERIZABLE COMPOUNDS

This invention relates to new photopolymerizable compounds and to copying compositions prepared therewith.

Photopolymerizable compositions as presently used for various applications, e.g. as copying layers in the reproduction field, contain photopolymerizable compounds, e.g. esters of acylic or methacrylic acid, particularly those of the acrylic acid, with multivalent aliphatic alcohols. Examples thereof are the following monomers: hexanediol-(1,6)-diacrylate, triethylene glycol diacrylate, polyethylene glycol diacrylate, neopentyl glycol diacrylate, diglycerol diacrylate, trimethylol propane triacrylate, pentaerythritol tetracrylate, dipentaerythritol hexacrylate, and the like.

The photopolymerizable compositions generally harden more rapidly under the action of light and are more cross-linked, i.e. are more light-sensitive, the greater the number of the acrylic ester groups present in the monomer molecule. But, on the other hand, it is advantageous not to select the number of acrylic ester groups per molecule too high since then premature cross-linkages may easily occur in the monomer, i.e. stabilization of such compositions is impaired. Regarding the balance of these properties, pentaerythritol tetraacrylate is a particularly favorable monomeric compound.

In photopolymerizable compositions, liquid monomers are preferred since crystallization, particularly in copying compositions and copying materials prepared therefrom, generally leads to a lack of uniformity and incompatibility in the layer, and finally to copying faults.

IN order to obtain, from these liquid monomers, copying compositions or layers of sufficient strength and, further, to impart additional desirable properties to the copying composition prior to and after exposure to light, organic polymers are added as binders to such copying compositions. It is desirable to àttune the monomer and added polymer to one another in such a manner that the monomer functions as a compatible plasticizer for the polymer and, despite the high monomer content, a non-tacky layer is obtained.

It is further important that the monomer be practically nonvolatile so that it is not lost in uncontrollable quantities in the coating processes, in which the solution of a copying composition is usually dried by heating.

Trimethylol ethane triacrylate, which allows the formulation of very light-sensitive and efficient copying compositions, for example, has an undesirably high volatility. Layers prepared therewith also have a considerable sticking tendency.

Pentaerythritol tetraacrylate is very difficultly volatile and allows the preparation of nearly non-tacky photopolymer layers, but this acrylate is a solid, highly crystallizing compound at room temperature, which, as noted above, is undesirable for the intended use.

It thus has been attempted to prepare acrylic esters of pentaerythritol as viscous as possible with as little cystallization tendency as possible.

According to the teaching of German Published Patent Application No. 1,267,547, this is achieved in that the pentaerythritol is esterified only partially with acrylic acid to a stage corresponding, on the average, to the triacrylate, and the residual OH groups are left free or further modified in difficult processes, e.g. by reaction with diazomethane, alkylene oxides, chloralkyl ethers and acids different from acrylic acid.

All these monomers of the pentaerythritol triacrylate type, which are valuable monomers with desirable application properties (very low volatility of the monomers, very low tackiness and high light-sensitivity of the layers), however, have a principal drawback originating from the production process. In the preparation of this ester corresponding, on the average, to a triacrylate, a mixture of different acrylation stages is obtained which varies somewhat in its composition. This cannot be regarded a priori as a drawback but the drawback lies in that also the highly crystallizing tetraacrylate is steadily formed in a varying amount and, during storage of the monomer, partially crystallizes. This crystallization also may occur in the photopolymerizable composition, with uncertainties resulting therefrom insofar as the quality of the copying materials produced with the use of such monomers is concerned.

The present invention provides new photopolymerizable monomers which have not the described disadvantages of the prior art.

The present invention provides new photopolymerizable compounds of the general formula A:

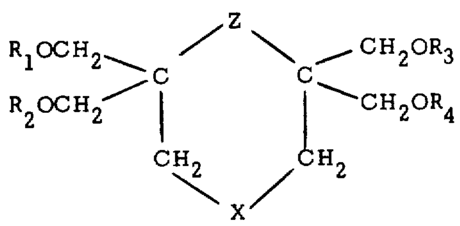

wherein

X is a single bond, an oxygen atom, or a $CH_2$ group,

Z is one of the groups —CO— and —CHOH—, and $R_1$, $R_2$, $R_3$, and $R_4$ are the same or different and are hydrogen atoms, or acryloyl or methacryloyl groups, Z is a carbonyl group, if X is a single bond, and, on an average, at least one of $R_1$, $R_2$, $R_3$, and $R_4$ is an acryloyl group.

The present invention further provides a photopolymerizable copying composition which, as the primary constituents, contains at least one binder, at least one polymerizable compound and at least one photoinitiator. As the polymerizable compound, it contains at least one compound of the general formula A as defined above.

Also in the case of a high degree of esterification, the compounds of the invention show practically no crystallization tendency.

The new acrylic esters are obtained by acid azeotropic esterification of the corresponding tetra- or pentaalcohols. It is surprising that, under the dehydrating conditions of this synthesis, the desired acylic esters are obtained in a high yield since, in B.88, 209 (1955), it is stated that, in the case of compounds of this type, a perhydropyrane ring is very easily closed with intramolecular dehydration from two methylol groups.

In order to achieve a cross-linkage density as high as possible, i.e. photopolymerizable compositions as highly light-sensitive as possible, it is desirable, in the praparation of the monomers, to propagate esterification with acrylic acid or acrylic and methacrylic acids as highly as possible, i.e. to form the tri- or tetraester. Esterification of the secondary OH group in the compounds which contain such a group proceeds very slowly so that the final stage of esterification generally is the tetraester.

Examples of specific representatives of the polyols corresponding to the general formula are the following types:

2,2,5,5-tetra-hydroxymethyl-cyclopentanone (I),
2,2,6,6-tetra-hydroxymethyl-cyclohexanone (II),
2,2,6,6-tetra-hydroxymethyl-cyclohexanol (III),
3,3,5,5-tetra-hydroxymethyl-tetrahydro-1,4-pyrone (IV), and
3,3,5,5-tetra-hydroxymethyl-4-hydroxy-tetrahydropyrane (V).

The preferred monomers are derived from the polyols I and III.

Particularly advantageous are the esters of I, preferably the products esterified as highly as possible, since this product can be prepared particularly easily and the copying layers produced therewith have the highest light-sensitivity.

The monomeric esters have a honey-like consistency. The photopolymerizable compostions prepared therewith may contain different substances as additives, depending on the intended use and the desired properties. Examples are:

inhibitors for inhibiting thermal polymerization of the compositions,
hydrogen donors,
substances modifying the sensitometric properties of such layers,
dyes,
colored and uncolored pigments,
color-forming agents
indicators,
plasticizers, and the like.

These constituents advantageously should be so selected that they absorb as little as possible in the actinic range important for the initiation procedure.

A variety of substances may be used as photoinitiators in the copying composition of the present invention. Examples are benzoin, benzoin ether, multinuclear quinones, e.g. 2-ethyl anthraquinone, acridine derivatives, e.g. 9-phenyl-acridine, 9-p-methoxyphenyl-acridine, 9-acetylamino-acridine, benz(a)acridine; phenazine derivatives, e.g. 9,10-dimethyl-benz(a)phenazine, 9-methyl-benz(a)phenazine, 10-methoxy-benz(a)phenazine; quinoxaline derivatives, e.g. 6,4',4''-trimethoxy-2,3-diphenyl-quinoxaline, 4',4''-dimethoxy-2,3-diphenyl-5aza-quinoxaline; quinazoline derivatives, and the like.

A variety of soluble organic polymers may be used as binders. Examples are: polyamides, polyvinyl esters, polyvinyl acetals, polyvinyl ethers, polyacrylic ester, polymethacrylic esters, polyesters, alkyd resins, polyacrylmide, polyvinyl alcohol, polyethylene oxide, polydimethylacrylamide, polyvinylpyrrolidone, polyvinyl methyl formamide, polyvinyl methyl acetamide, as well as copolymers of the monomers forming the stated homopolymers.

Further suitable binders are natural or modified natural substances, e.g. gelatin, cellulose ether, and the like.

Advantageously used are binders soluble or at least swellable in aqueous alkaline solutions since layers with such binders can be developed with the preferred aqueous alkaline developers. Such binders may contain the following groups, for example: —COOH, —$PO_3H_2$—, $SO_3H$, —$SO_2NH_2$, —$SO_2$—NH—CO, and the like.

Equally preferred are: maleic resins, polymers of N-(p-tolylsulfonyl)-carbamic acid-(β-methacryloyloxy)-ethyl ester and copolymers of these and similar monomers with other monomers (described in copending application Ser. No. 149,391, filed June 2, 1971), now U.S. Pat. No. 3,725,356 copolymers of styrene and maleic anhydride and copolymers of methyl methacrylate and methacrylic acid.

It is also possible to add known monomers, particularly acryl esters of multivalent aliphatic alcohols, to the monomers of the invention, taking care, of course, that the above advantages achieved by the use of the monomers of the invention in the photopolymerizable composition are not excessively reduced thereby.

The photopolymerizable compounds of the invention may be used for various applications, e.g. for the production of saftey glass, as lacquers which are hardened by the action of light or corpuscular rays, e.g. electron rays, and particularly as light-sensitive copying compositions in the reproduction field.

The detailed description of the invention is limited to the latter field of application, but such is not a limitation of the invention. Application possibilities in this field are as follows: copying layers for the photomechanical production of printing forms for relief printing, planographic printing, intaglio printing, screen printing, of relief copies, e.g. the production of texts in Braille, of single copies, dye images, pigment images, and the like. The compositions further may be used for the photomechanical production of etch resists, e.g. for the production of name plates, of printed circuits and for chemical milling. The copying compositions of the invention have particular importance as copying layers for the photomechanical production of planographic printing forms and of etch resists, particularly as presensitized materials.

Industrial use of the copying composition for the stated application purposes may be in the form of a liquid solution or dispersion, e.g. as a so-called photoresist composition, which is applied by the user himself to an individual support, e.g. for chemical milling, for the production of printed circuits, for screen printing stencils, and the like. The composition also may be present as a solid light-sensitive layer on a suitable support in the form of a light-sensitive copying material precoated for storage purposes, e.g. for the production of printing forms.

It is generally advantageous to substantially exclude the compositions during light polymerization from the influence of the oxygen of the air. This may be done, for example, by incorporating paraffin which accumulates on the layer surface and forms a barrier to oxygen.

When using the composition in the form of thin copying layers, it is recommended to apply a suitable top film only slightly permeable to oxygen. This film may be self-supporting and stripped before development of the copying layer. Polyester films are suitable for this purpose, for example. The top film also may consist of a material which dissolves in the developer liquid or can be removed during development at least in the non-hardened areas. Materials suitable therefore are, for example, waxes, polyvinyl alcohol, polyphosphates, sugar, and the like.

Suitable supports for copying materials produced with the copying composition of the invention are, for example, aluminum, steel, zinc, copper, and plastic films, e.g. of polyethylene terephthalate or cellulose acetate, as well as screen printing supports, such as Perlon gauze. In many cases, it is advantageous to subject the surface of the support to a pretreatment (chemical or mechanical) which properly adjusts the adhesion of the layer or reduces the reflecting power of the support in the actinic range of the copying layer (antihalation).

The preparation of the light-sensitive materials with the use of the copying composition of the invention is performed in known manner.

It may be dissolved in a solvent and the solution or dispersion may be applied by casting, spraying, immersion, roller application, and the like, as a film to the support and then dried. Thick layers (e.g. of $250\mu$ and more) are advantageously prepared by extrusion or moulding as a self-supporting film which is then laminated to the support.

Processing of the copying materials is performed in known manner.

The unsaturated esters of the invention can be prepared relatively simply. Starting materials are the above-described polyalcohols of Formulae I to V, which can be obtained as technical products or synthesized according to the following working methods:

| | | |
|---|---|---|
| Formula I: | B.56, page 843 (1923), and U.S. Patent No. 2,500,570 | Melting point 143° C |
| Formula II: | B.56, page 840 (1923) | 143° C |
| Formula III: | Org. Synth., volume 31, page 101 | 129–130° C |
| Formula IV: | B.88, page 210 | 127° C |
| Formula V: | B.88, pages 205 - 212 Commercial product of Trojan Powder Co. Allentown, U.S.A. | 135–146° C |

Since all polyalchols do not differ considerably in their molecular weights, a general working method for the preparation of the tetraester can be given as follows:

200–210 parts by weight of polyalcohol,
430–580 parts by weight of acrylic acid or mixtures of acrylic and methacrylic acid (100 per cent),
500–800 parts by weight of benzene,
5–20 parts by weight of concentrated sulfuric acid, and
0.5–5 parts by weight of copper-I-oxide are placed in a three-necked flask equipped with a stirrer, water separator and reflux condenser, and the mixture is heated, with stirring, under reflux. After about 3 to 7 hours, the calculated quantity of water is azeotropically separated. After the reaction mixture has cooled, the excess of acid is removed by washing with 10 to 20 per cent sodium chloride solution and then with 15 to 25 per cent potassium carbonate solution.

After separation and drying of the organic phase with sodium sulfate, this phase is freed from benzene by vacuum distillation with the addition of 2 to 10 parts by weight of stabilizer, e.g. p-methoxyphenol.

The resulting residue is the desired tetraester of the polyalcohol in a yield of 40 to 90 per cent of the theoretical amount. It is an optimum yield in the case of the tetraacrylate of the compound of Formula I.

The simplest way for the preparation of the incompletely esterified products is stopping the esterification reaction at the desired degree of esterification, which can be recognized by means of the quantity of the separated water.

The following examples illustrate specific embodiments of the invention, which is not limited to these embodiments, however. If not otherwise stated, percentages are by weight; 1 part by weight corresponds to 1 g if 1 part by volume is 1 ml.

EXAMPLE 1

A coating solution containing 1.4 parts by weight of a copolymer of methyl methacrylate and methacrylic acid, having an average molecular weight of 33,000 and an acid number of 85.5,
1.4 parts by weight of the acrylic acid-esterified 3,3,-5,5-tetra-hydroxymethyl-4-hydroxytetrahydropyrane of Formula V (saponification number 455),
0.2 part by weight of 1,6-di-hydroxyethoxy-hexane,
0.05 part by weight of 9-phenyl-acridine,
0.02 part by weight of Supranol Blue Gl (C.I. 50,335), and
15.0 parts by weight of ethylene glycol monomethyl ether is whirl-coated onto an electrolytically roughened and anodized 0.3 mm thick aluminum foil and dried. The layer weight is 5 to 6 g/$m^2$.

In a second process step, the dried solvent-free photopolymer layer is coated with a 1 g/$m^2$ top coating only slightly permeable to oxygen and having the following composition 1.0 part by weight of sucrose,
1.0 part by weight of methyl cellulose (Tylose MH 20 of Kalle AG, Wiesbaden-Biebrich),
1.0 part by weight of saponin, and
0.1 part by weight of sorbic acid in
96.9 parts by weight of water.

The photopolymer plate obtained is exposed under a negative to a xenon point light lampe (COP XP 5000 to Staub, Neu Isenburg, Germany, trade name "Xenokop") at a distance of 80 cm between the lamp and the printing frame. After exposure, the non-image areas are removed with an aqueous alkaline developer — such as that described in Example 8 of German Patent Specification No. 1,193,366. The plate is then briefly wiped over with dilute 1 per cent aqueous phosphoric acid. A positive printing form is obtained which accepts ink readily and the non-image areas of which remain free from scumming.

When the plate is not printed immediately after production, it may be gummed in known manner.

EXAMPLE 2

A coating solution containing 1.4 parts by weight of the acrylic acid-esterified 2,2,-6,6-tetra-hydroxymethyl-cyclohexanol of Formula III (saponification number 480.6),
0.5 part by weight of an acrylic resin having an average molecular weight of 36,000 (Elvacite 2008 of Du Pont de Nemours and Co., Wilmington, Delaware U.S.A.),
0.9 part by weight of a copolymer of methyl methacrylate and methacrylic acid, having an average molecular weight of 40,000 and an acid number of 90 to 105, 0.05 part by weight of 2,3-di-(4-methoxy-phenyl)-6-methoxy-quinoxaline, 0.2 part by weight of 1,6-di-hydroxyethoxy-hexane, 0.02 part by weight of Supranol Blue Gl and 15.0 parts by weight of ethylene glycol monoethyl ether is whirl-coated onto electrolytically roughened 0.1 mm thick aluminum (Rotablatt of Rotaprint AG, Berlin, Germany). The layer is then dried for 2 minutes at 100°C in a drying cabinet and then has a thickness corresponding to a weight of about 5 g/m$^2$.

In a second process step, a top coating from a solution of 15.0 parts by weight of polyvinyl alcohol (Elvanol 52-22 of Du Pont De Nemours and Co., Wilmington, Delaware, U.S.A.), and 0.25 part by weight of sodium alkyl benzene sulfonate as wetting agent in 485.0 parts by weight of water is applied in a thickness of 0.1 to 1 g/m$^2$ to the photopolymer layer.

As in Example 1, the layer combination is exposed for 1 minute under a negative original and developed.

A positive printing form is obtained which readily accepts ink, is free from scumming, and yields long printing runs.

Similar results are obtained by using the same sensitizing solution in which, however, the acrylic ester of the tetrahydroxymethyl cyclohexanol is replaced by the same quantity of a monomer obtained by esterification of 2,2,5,5-tetrahydroxymethyl-cyclopentanone (I) with a mixture of equimolar portions of acrylic acid and methacrylic acid (saponification number 517).

EXAMPLE 3

A 0.125 mm thick biaxially stretched polyethylene terephthalate film provided with an adhesive layer according to German Published Patent Application No. 1,228,414, is coated with the following coating solution and the coating is dried:

1.4 parts by weight of Lytron 822 (copolymer of styrene and maleic anhydride, average molecular weight 10,000, acid number 190, manufacturer: Monsanto Chemical Co., St. Louis, Mo., U.S.A.), 1.3 parts by weight of 2,2,6,6-tetra-acryloxymethyl-cylcohexanol (Type III) (saponification number 480), 0.1 part by weight of benz-(a)-acridine (Revised Ring Index 5007), 0.2 part by weight of 1,6-di-hydroxyethoxy-hexane, and 17.0 parts by weight of ethylene glycol monoethyl ether.

The film is then coated with a solution of 1.0 part by weight of sucrose, 1.0 part by weight of saponin, 1.0 part by weight of methyl cellulose as in Example 1, and 0.1 part by weight of sorbic acid in 96.9 parts by weight of water, and the layer is dried.

After exposure for 3 minutes under a negative original to the light source described in Example 1, development is performed with the developer used in Example 1. A positive planographic printing form is obtained.

EXAMPLE 4

A zinc plate suitable for powderless etching is coated with a solution of the following composition and the coating is dried:

1.4 parts by weight of Alresen 500 R (terpene phenol resin of Chemische Werke Albert, WiesbadenBiebrich, Germany), 1.0 part by weight of 2,2,5,5-tetra-acryloxymethyl-cyclopentanone (Type I) (saponification number 540), 0.02 part by weight of Sudan Blue II (C.I. Solvent Blue 35), 0.05 part by weight of 9-(p-tolyl)-acridine, and 8.0 parts by weight of methyl ethyl ketone.

The plate is then coated with a thin polyvinyl alcohol film (1 to 2$\mu$) and exposed for 2 minutes under a negative line original to the light source indicated in Example 1.

After development as in Example 1, the bared zinc surface is deep etched by treatment for 5 minutes at room temperature with 6 per cent nitric acid. A relief printing form is obtained.

EXAMPLE 5

An aluminum plate covered with a thin copper layer is cleaned with pumice powder, then immersed for 30 seconds in 1.5 per cent nitric acid solution and then treated for 1 minute with a solution of 84 ml of water and 8 ml of a chromate solution (Kenvert No. 31 of Conversion Chemical Corp., Rockville, Connecticut, U.S.A.). The following solution is then whirl-coated onto the plate and dried:

1.4 parts by weight of a copolymer of methyl methacrylate and methacrylic acid (average molecular weight 40,000, acid number 90 to 100), 1.4 parts by weight of the monomer used in Example 4, 0.2 part by weight of 1,6-di-hydroxyethoxy-hexane, 0.05 part by weight of 2-ethyl-anthraquinone, and 13.0 parts by weight of ethylene glycol monoethyl ether.

As in Example 4, the layer is coated with a thin polyvinyl alcohol film.

After exposure for 5 minutes under a negative to the light source of Example 1 and development as in Example 1, the copper is etched away in the bared areas by means of an iron-III-chloride solution of 40° Be. After decoating, e.g. by rubbing with methylene chloride, the plate is wiped over with phosphoric acid and inked up with greasy ink. A positive printing form is obtained which yields very long runs.

EXAMPLE 6

The procedure is the same as in Example 5 but the support used is a trimetal plate of steel, copper, and chromium and, in the coating solution, the 2-ethyl-anthraquinone is replaced by the same quantity of 9-phenyl-acridine.

The coating described in Example 3 is applied to the light-sensitive layer. Exposure (2 minutes to the light source of Example 1) is carried out under a positive. After development with the developer described in Example 1, the bared chromium surface is treated with a chromium etching solution (17.4 per cent of $CaCl_2$, 35.3 per cent of $ZnCl_{12}$, 2.1 per cent of HCl, and 45.2 per cent of $H_2O$) until the copper layer beneath is completely bared.

After decoating with the dye remover Turco-carb of Turco-Chemie GmbH, Hamburg, Germany, the plate is wiped over with phosphoric acid and inked up. A very efficient positive trimetal printing form is obtained.

EXAMPLE 7

The procedure is the same as in Example 6 but the support used is a brass foil coated with a thin chromium layer.

In this case also, a highly efficient multi-metal printing form is obtained.

EXAMPLE 8

A monofil Perlon fabric suitable for screen printing which has 120 filaments per cm is coated with the following solution and the layer is dried:

1.4 parts by weight of a copolymer of methyl methacrylate and methacrylic acid (average molecular weight 40,000, acid number 90 to 100),
1.4 parts by weight of the monomer used in Example 4,
0.05 part by weight of 9-phenyl-acridine,
0.2 part by weight of 1,6-di-hydroxyethoxy-hexane,
0.02 part by weight of Supranol Blue Gl and
8.0 parts by weight of methyl ethyl ketone.

The material is exposed for 3 minutes under a positive original to the light source of Example 1 and developed with the developer described in Example 1. A positive screen printing form is obtained.

EXAMPLE 9

A hard paper plate laminated with a 35$\mu$ thick copper foil, as is usual for the production of printed circuits, is cleaned with pumice powder, then immersed for 30 seconds in 10 per cent aqueous hydrochloric acid, rinsed with water, dried, coated with the sensitizing solution described in Example 4, and the coating is dried.

After the application of a top coating of polyvinyl alcohol, the plate is exposed for 1½ minutes under a negative (light source as in Example 1) which has a system of conductive paths. After development as in Example 1, the copper is etched away in the bared areas in a conventional etching machine by means of iron-III-chloride solution of 40° Be. A printed circuit is obtained.

EXAMPLE 10

To a 0.3 mm thick anodized aluminum sheet the edges of which are bent through 90°, there is applied a coating solution of 1.5 parts by weight of 2,2,6,6-tetraacryloxymethylcyclohexanol (Type III) (saponification number 480),
1.9 parts by weight of 2,2,5,5-tetraacryloxymethylcyclopentanone (Type I) (saponification number 540),
4.9 parts by weight of a copolymer of methyl methacrylate and methacrylic acid, having an average molecular weight of 40,000 and an acid number of 125,
0.3 part by weight of 9-phenyl-acridine, and
10.0 parts by weight of methyl ethyl ketone and dried for 5 days in a circulated-air dryer at 30°C to form a dry layer of a thickness of 0.6 mm.

The resulting plate is then exposed for 20 minutes under a photographic negative to a three-phase carbon arc lamp of 60 amperes ("Brillant" of Staub, Neu Isenburg, Germany) at a distance of 110 cm.

After development for 15 minutes in the rocking bath with the developer described in Example 1, a firmly adhering yellow-brown relief image is obtained which, after the removal of the edges, can be employed for relief or letterset printing.

EXAMPLE 11

Onto a 180$\mu$ thick polyethylene terephthalate film (Melinex G), there is whirl-coated the following composition and the coating is dried:

1.4 parts by weight of the copolymer of styrene and maleic anhydride as used in Example 3,
1.3 parts by weight of 2,2,5,5-tetra-acryloxymethyl-cyclopentanone (Type I) (saponification number 540),
0.2 part by weight of diethylene glycol monohexyl ether,
0.05 part by weight of benz-(a)-phenazine,
0.02 part by weight of Zapon Fast Blue HFL (C.I. 74,350),
17.0 parts by weight of ethylene glycol monoethyl ether.

The layer is coated with an about 1$\mu$ thick polyvinyl alcohol layer.

Exposure is performed for 3 minutes with the light source indicated in Example 1 under a color separation screen negative. Development is performed with the developer indicated in Example 1. A blue colored copy (positive) of the original is obtained, which may be used as a registration guide.

It is possible, analogous to Example 9 of copending application Ser. No. 149,390, filed June 2, 1971, to obtain in the same manner colored copies in red, yellow, and black with appropriate dyeing of the layers and exposure to light under the corresponding color separation negatives and to obtain a color proof by superposition in exact register.

EXAMPLE 12

A 25 $\mu$ thick polyethylene film is coated with a solution containing:

1.4 parts by weight of a copolymer of methyl methacrylate and methacrylic acid, having a molecular weight of 40,000 and an acid number of 90 to 115,
1.4 parts by weight of 2,2,5,5-tetra-acryloxymethyl-cyclopentanone (Type I) (Saponification number 540),
0.05 part by weight of 9-phenyl-acridine,
0.02 part by weight of Supranol Blue Gl, and
13.0 parts by weight of ethylene glycol monoethyl ether.

After drying, a 25$\mu$ thick polyethylene terephthalate film is laminated thereto at a temperature of 70° to 90°C. The thickness of the photopolymer layer is 7 to 8$\mu$. After the polyethylene film has been stripped, the photopolymer layer and the polyester film are laminated, with heating, to a composite material of hard paper and a 35$\mu$ thick copper foil suitable for the production of printed circuits, after the latter has been cleaned as usual. Image-wise exposure is carred out analogous to Example 9. The polyester film is then stripped and the composite material is processed into a printed circuit analogous to Example 9.

EXAMPLE 13

"Mat chromium" is electrodeposited in a thickness of 1 to 1.5μ onto a 0.25 mm thick aluminum sheet.

The chromium surface of the aluminum is then whirl-coated with a solution of:

1.4 parts by weight of 2,2,5,5-tetra-acryloxymethyl cyclopentanone (Type I) (saponification number 540), 1.4 parts by weight of a copolymer of methyl methacrylate and methacrylic acid, having a molecular weight of about 35,000 and an acid number of 95, 0.1 part by weight of 9-phenyl-acridine, 0.005 part by weight of 4-dimethylamino-benzalacetone, 0.015 part by weight of Brilliant Blue Salt SM (a triphenyl methane dye of Farbwerke Hoechst AG), 11.5 parts by weight of ethylene glycol monoethyl ether, and 2.65 parts by weight of methyl ethyl ketone.

The photopolymer layer is then dried for 2 minutes at 100°C in a drying cabinet and then has a thickness of 5.8 g/m².

In a second process step, the photopolymer layer is coated with a 0.5 to 1 g/m² thick top coating of a solution of 15.0 parts by weight of polyvinyl alcohol (Elvanol 52-22 of Du Pont de Nemours and Co., Wilmington, Delaware, U.S.A.), and 0.25 part by weight of sodium alkyl benzene sulfonate as a wetting agent in 485.0 parts by weight of water.

As in Example 1, the layer combination is exposed for 1 minute under a negative original, a distinct image contrast becoming visible thereby (exposed areas partially bleach), and the non-image areas are then removed with an aqueous alkaline developer as it is described in Example 8 of German Patent No. 1,193,366. This is followed by briefly wiping over with 1 per cent aqueous phosphoric acid, and the image areas are inked up with greasy ink.

A very firmly adhering ink-receptive positive printing form is obtained, the non-image areas of which remain free from scumming.

It will be obvious to those skilled in the art that many modifications may be made within the scope of the present invention without departing from the spirit thereof, and the invention includes all such modifications.

What is claimed is:

1. A photopolymerizable compound having the formula

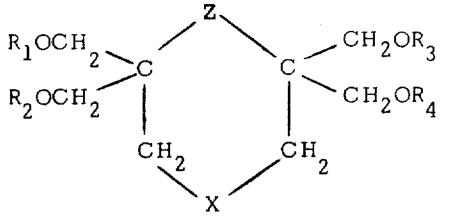

A in which

X is selected from the group consisting of a single bond, an oxygen atom and a —$CH_2$— group, Z is selected from the group consisting of —CO— and —CHOH— groups, and $R_1$, $R_2$, $R_3$, and $R_4$ are selected from the group consisting of hydrogen and acryloyl or methacryloyl groups, Z is a carbonyl group if X is a single bond and, on an average, at least one of the groups $R_1$, $R_2$, $R_3$, and $R_4$ is an acryloyl group.

2. A compound according to claim 1 in which Z is a carbonyl group and X is a single bond.

3. A compound according to claim 1 in which $R_1$, $R_2$, $R_3$, and $R_4$ are selected from the group consisting of acryloyl and methacryloyl groups.

4. 2,2,5,5-Tetra-acryloyloxymethyl-cyclopentanone.

5. 2,2,6,6-Tetra-acryloyloxymethyl-cyclohexanol.

* * * * *